United States Patent [19]

Kuwayama et al.

[11] Patent Number: 4,614,256
[45] Date of Patent: Sep. 30, 1986

[54] PARKING BRAKE STRUCTURE FOR AUTOMATIC TRANSMISSION MECHANISM

[75] Inventors: Yoshinari Kuwayama; Masakatsu Miura, both of Anjo; Kunio Morisawa, Toyota, all of Japan

[73] Assignees: Aisin-Warner, K.K., Anjo; Toyota Jidosha K.K., Toyota, both of Japan

[21] Appl. No.: 498,911

[22] Filed: May 27, 1983

[30] Foreign Application Priority Data

May 28, 1982 [JP] Japan ................................ 57-091722

[51] Int. Cl.[4] .......................... B60K 41/26; B60T 1/00
[52] U.S. Cl. ....................................... 192/4 A; 188/31
[58] Field of Search ............... 192/4 A, 4 R; 74/411.5, 74/710.5, 99 A, 107, 569; 188/69, 31

[56] References Cited

U.S. PATENT DOCUMENTS

| | | | |
|---|---|---|---|
| 3,386,532 | 6/1968 | Moss | 192/4 A |
| 3,601,230 | 8/1971 | Platz | 192/4 A |
| 3,877,549 | 4/1975 | Clark | 188/60 X |
| 3,912,050 | 10/1975 | Iwanaga et al. | 192/4 A |
| 4,413,712 | 11/1983 | Richard | 192/4 A |

Primary Examiner—George H. Krizmanich
Attorney, Agent, or Firm—Cooper, Dunham, Griffin & Moran

[57] ABSTRACT

An automatic transmission locking mechanism for parking, including a cam rod provided in the front portion thereof with a cam of a predetermined shape and interlocked at the rear end thereof with a manual shift lever, a sleeve supporting and guiding the cam rod for smooth axial movement and a pawl provided with a detent which made to engage with the parking gear of an automatic transmission by the axial movement of the cam rod when the manual shift lever is shifted to place the automatic transmission in the parking range.

3 Claims, 2 Drawing Figures

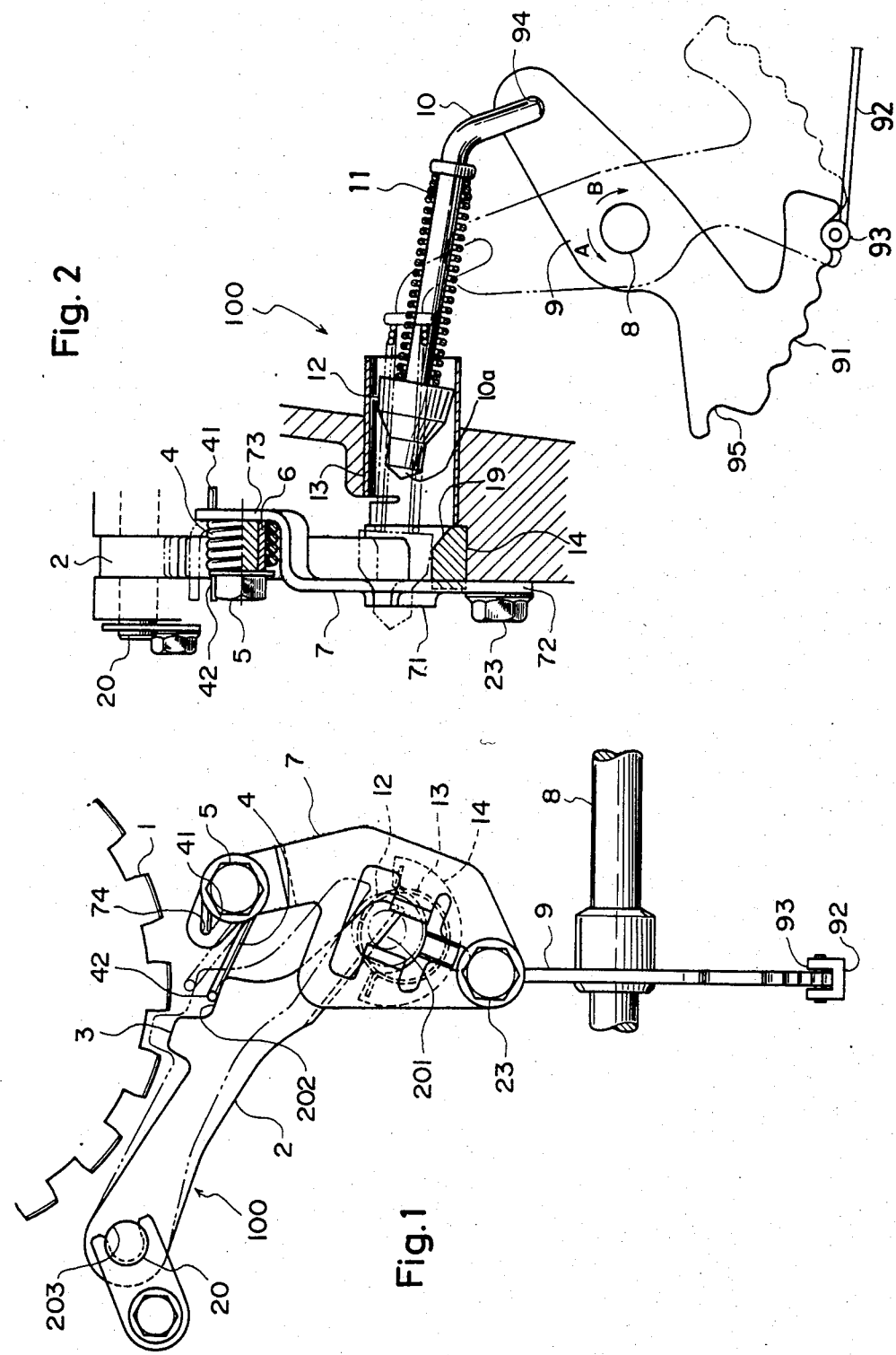

PARKING BRAKE STRUCTURE FOR AUTOMATIC TRANSMISSION MECHANISM

BACKGROUND OF THE INVENTION

1. Field of the Invention

This invention relates to an automatic transmission locking mechanism for parking and more particularly to an automatic transmission locking mechanism for an automatic transmission of a reduced axial dimension for a vehicle.

2. Description of the Prior Art

In most front-engine front-drive automobiles (designated as "FF automobiles" hereinafter), the engine is mounted transversely. Accordingly, the axial dimension of an automatic transmission for an FF automobile is required to be reduced, particularly when the engine is mounted transversely. Most conventional automatic transmission locking mechanisms interlocked with a manual shift lever employ the following constitution. That is, a lever is joined integrally to a manual shaft which is turned through the manual operation of a manual shift lever, the rear end of a cam rod provided intermediately with a cam is linked to the lever, a pawl with a detent is pushed up when the cam is caused to run on a slope formed in a bracket supporting the front portion of the cam rod extending forward from the cam, whereby the detent engages with a parking gear fixed to the output shaft of the transmission to lock the output shaft. Since the long rod extending forward from the cam is liable to increase the axial dimension of the automatic transmission, such a conventional automatic transmission locking mechanism is unsuitable for an automatic transmission for FF automobiles, in which the axial dimension of the automatic transmission is restricted.

Accordingly, it is an object of the present invention to provide an automatic transmission locking mechanism for parking suitably applicable to an automatic transmission of a reduced axial dimension for an FF automobile, in which the overall length of the cam rod is reduced significantly as compared with that of the conventional cam rod and thereby the axial dimension of the locking mechanism is reduced.

An automatic transmission locking mechanism according to the present invention includes a cam rod provided at the front end thereof with a cam of a predetermined shape and interlocked at the rear end thereof with a manual shift lever, a sleeve supporting and guiding the cam rod for smooth axial movement and a pawl provided with a detent, wherein the pawl is pushed with the cam of the cam rod through the axial movement of the cam rod, whereby the detent is engaged with the parking gear of the automatic transmission to lock the automatic transmission.

Other objects and features of the present invention will become apparent from the following detailed description of the preferred embodiment thereof, taken in connection with the accompanying drawings.

BREIF DESCRIPTION OF THE DRAWING

FIG. 1 is a front view of an automatic transmission locking mechanism according to the present invention, for facilitating the description of the operation thereof, and FIG. 2 is a side view of the automatic transmission locking mechanism of FIG. 1, for facilitating the description of the operation thereof.

DESCRIPTION OF THE PREFERRED EMBODIMENT

Referring to FIGS. 1 and 2, an automatic transmission locking mechanism 100 includes a detent lever 9, a rod 10, a cam 12, a sleeve 13, a bracket 14, a pawl 2 provided with a detent, a torsion spring 4, a bracket 7 and a parking gear 1.

The detent lever 9 is a plate member directly connected to a manual shaft 8 which is turned through the operation of a manual shift lever, not shown, and is turned together with the manual shaft 8. A plurality of notches 91 are formed in the circular edge of the detent lever 9 at positions corresponding to the shift positions (in this embodiment, six positions corresponding to parking, neutral, drive, 3rd and low shift positions) respectively. The free end 93 of a detent spring 92 engages with those notches 91 as the detent lever 9 is turned. The rear end of the rod 10 is rotatably fitted in a hole 94 formed in the detent lever 9 opposite to the circular edge having the notches 91. The rod 10 is pushed forward as the detent lever 9 is turned in a counterclockwise direction. The cam 12 is slidably fitted on the rod 10 in the front portion thereof and is adapted to be biased with a coil spring 11 mounted round the rod 10 to form a cam rod. The cam 12 is pushed forward as the rod 10 is pushed forward. The cam 12 has a conical surface of a sharp concial angle and a conical surface of an obtuse conical angle each being tapered toward the front end 10a of the rod 10. The cam 12 is guided by and advances within the tubular sleeve 13 as the detent lever 9 is turned in the direction of the arrow A and finally enters a case. Then, the cam 12 runs on a slope 19 formed in the semicircular bracket 14 fixed to the case with the plate 7 and bolts 5 and 23 and is forced into a gap formed between the bracket 14 disposed in front of the sleeve 13 and one end portion 201 of the pawl 2 provided with a detent 3, whereby the pawl 2 is pushed up gradually. Upon the entrance of the free end 93 of the detent spring 92 into a notch 95 corresponding to the parking position of the manual shift lever, the cam 12 rides onto the top of the slope 19 of the bracket 14 and pushes up the pawl 2. The pawl 2 is turned on a pole shaft 20 provided at the other end of the pawl 2 and thereby the detent 3 of the pawl 2 is engaged with the parking gear 1 to lock the automatic transmission. The torsion spring 4 engaged at one end 41 thereof with a hole 71 formed in the plate 7 and at the other end 42 thereof with the pawl 2 in the vicinity of the detent 3 is mounted round a bolt 5 through a spacer 6 to bias one end 201 of the pawl toward the bracket 14. Since the slope 19 of the bracket 14 is formed in a conical surface, the cam 12 moves perpendicularly to the contact surface of one end 201 of the pawl 2 in pushing up the pawl 2. The cam 12 is supported by the plate 7 after leaving the sleeve 13.

As described hereinbefore, since the automatic transmission locking mechanism according to the present invention includes a cam rod provided at the front end thereof with a cam of a predetermined shape and interlocked at the rear end thereof with a manual shift lever, a sleeve supporting and guiding the cam rod for smooth axial movement and a pawl provided with a detent, wherein the pawl is pushed with the cam of the cam rod through the axial movement of the cam rod, whereby the detent is engaged with the parking gear of the automatic transmission to lock the automatic transmission, the overall length of the cam rod can be reduced and thereby the dimensions of the mechanism are reduced to form a compact construction. Thus, the automatic transmission locking mechanism of the present invention is suitably applicable to an automatic transmission of a reduced axial dimension for an FF automobile.

We claim:

1. Parking brake structure for automatic transmission mechanism comprising:
   (a) a parking gear having teeth at the outer periphery and rotatably mounted around a shaft;
   (b) a pawl element pivotably mounted between a locked position in which the pawl element engages with the parking gear and a released position in which the pawl element disengages from the parking gear;
   (c) a bias member urging the pawl element toward the released position with one end thereof rested on a stationary member;
   (d) a rod member movably mounted in the direction generally perpendicular to the oscillating plan of the pawl element;
   (e) a cam member substantially secured to one end of the rod member to pivot the pawl element toward the locked position against the force of the bias member and away from the locked position in company with the reciprocating movement of the rod member, and the cam member carrying a conical cam surface of first conical angle and that of second conical angle greater than the first conical angle, each tapered toward the one end of the pawl element; and
   (f) a sleeve guide member into which the cam member slides, and having a length equivalent to that required for the cam member to move so as to pivot the pawl element between the locked position and the released position.

2. Parking brake structure for automatic transmission mechanism as set forth in claim 1 wherein the sleeve guide member is interfit into an annular portion provided with the stationary member.

3. Parking brake structure for automatic transmission mechanism as set forth in claim 1 wherein a plate member is provided with the stationary member to support one end of the rod member when the rod member moves to pivot the pawl element to the locked position.

* * * * *